(12) United States Patent
Cho et al.

(10) Patent No.: US 9,331,363 B2
(45) Date of Patent: May 3, 2016

(54) STRUCTURAL ELECTRIC DEVICE HAVING IMPROVED SAFETY

(75) Inventors: Seung Su Cho, Daejeon (KR); Seung Taek Hong, Seoul (KR); Seung Don Choi, Daejeon (KR); Dae Sik Choi, Daejeon (KR); Yong Kyu Ju, Daejeon (KR); Dae Hong Kwon, Daejeon (KR); You Rim Yoon, Daejeon (KR); Soul Gie Hong, Seoul (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/348,671

(22) Filed: Jan. 12, 2012

(65) Prior Publication Data

US 2012/0114981 A1    May 10, 2012

Related U.S. Application Data

(63) Continuation of application No. PCT/KR2011/007717, filed on Oct. 17, 2011.

(30) Foreign Application Priority Data

Oct. 19, 2010 (KR) .......... 10-2010-0101679
Oct. 5, 2011  (KR) .......... 10-2011-0100959

(51) Int. Cl.
*H01M 14/00*   (2006.01)
*H01M 10/42*   (2006.01)

(52) U.S. Cl.
CPC .......... *H01M 10/42* (2013.01); *H01M 2200/00* (2013.01)

(58) Field of Classification Search
CPC .......................... H01M 10/42; H01M 2200/00
USPC ............................................. 429/1, 148, 453
See application file for complete search history.

(56) References Cited

U.S. PATENT DOCUMENTS

2005/0255376 A1* 11/2005 Cho et al. .......... 429/61
2008/0008927 A1    1/2008 Lee et al.

FOREIGN PATENT DOCUMENTS

KR   10-2007-0110566 A   11/2007
KR   10-2008-0005621 A   1/2008
KR   10-2008-0005623 A   1/2008

OTHER PUBLICATIONS

KR 10-2007-0110566—Translation.*
KR 10-2008-0005621—Translation.*

* cited by examiner

*Primary Examiner* — Ladan Mohaddes
(74) *Attorney, Agent, or Firm* — Birch, Stewart, Kolasch & Birch, LLP (57) ABSTRACT

Provided is a novel structural electric device having improved safety. More particularly, provided is a novel structural electric device devised to resolve several issues regarding heat generation, ignition, and explosion, which may be caused by a sharp needle-shaped object penetrating an electric device.

7 Claims, 5 Drawing Sheets

STRUCTURAL ELECTRIC DEVICE HAVING IMPROVED SAFETY

CROSS-REFERENCE TO RELATED APPLICATIONS

This application is a continuation of International Application No. PCT/KR2011/007717 filed on Oct. 17, 2011, which claims priority from Korean Patent Application No. 10-2010-0101679 filed in Republic of Korea on Oct. 19, 2010 and Korean Patent Application No. 10-2011-0100959 filed in Republic of Korea on Oct. 5, 2011, the entire contents of which are incorporated herein by reference.

BACKGROUND OF THE INVENTION

The present invention disclosed herein relates to a novel structural electric device having improved safety, and more particularly, to a novel structural electric device devised to resolve several issues regarding heat generation, ignition, and explosion, which may be caused by a sharp needle-shaped object penetrating an electric device.

A secondary battery is classified into a cylindrical type, a polygonal type, and a pouch type according to packaging types and manufacturing methods and has been developed and manufactured until now.

Measures to deal with an issue of a sharp needle-shaped object penetrating into a secondary battery or an issue occurring during a test for a needle-shaped penetration in a secondary battery may vary according to packaging types and manufacturing methods. However, most of the measures may not provide reliable solutions. This is because there is no sure solution to basically resolve a short phenomenon between electrodes that constitute a battery.

As a representative method for resolving the above short phenomenon, a method of improving the stability for needle-shaped penetration in a secondary battery by coating an isolation layer with ceramic material is introduced. However, a new approach is required as the size of a secondary battery is increased and its energy density becomes higher. However, the above method with the coated isolation layer may not obtain basic stability easily.

Moreover, it is a common situation that explosion occurs while metal penetrates a secondary battery under an abnormal condition or a safety test such as a penetration test for a secondary battery is in progress. Based on the situation, the explosion cause may be inferred as follows.

If a penetrating material has high electrical conductivity, it causes a short between positive and negative electrodes in a secondary battery. Also, due to this, current flows internally. As a result, a deterioration phenomenon of the secondary battery occurs easily and furthermore an ignition or explosion phenomenon occurs also.

Thus, in order to prevent dangerous situations such as abnormal explosion of a secondary battery before happening when a needle-shaped object penetrates the secondary battery, studies on preventing the above dangerous situations basically and improving the stability of the secondary battery are required.

SUMMARY OF THE INVENTION

The present invention provides an electric device basically improving the stability thereof further more when there is a penetration issue of the electric device caused by a sharp needle-shaped object.

The present invention also provides an external short induction kit for inducing an external short of an electric device. Accordingly, when a sharp needle-shaped object penetrates the electric device, the external short induction kit receives an attack from the sharp needle-shaped object first to protect the electric device.

Moreover, since the external short kit induces a compulsory external short to lower the voltage and energy of the electric device, even when a needle-shaped object enters into the electric device, an amount of internally-flowing current is limited. Thus, an issue regarding explosion of the electric device due to a needle-shaped penetration in the electricity device may be basically resolved.

Embodiments of the present invention provide external short induction kits of an electric device include: at least two conductive members; at least two connectors having one side connected to the conductive member and the other side connected to an electrode of the electric device or a connection part, the connection part being an electrical pathway between electrodes of the electric device; and an insulation layer interposed between the at least two conductive members.

In some embodiments, the electric device may be one of a secondary battery, a battery module including a plurality of unit batteries, and a battery pack including the plurality of battery modules but is not limited thereto.

In other embodiments of the present invention, secondary batteries in which a unit battery including a positive electrode, a negative electrode, and a separation layer is connected to at least one external short induction kit are provided.

The external short induction kit may include: a first conductive member; a first connector connecting the first conductive member and a positive electrode of the unit battery; a second conductive member; a second connector connecting the second conductive member and a negative electrode of the unit battery; and an insulation layer interposed between the first conductive member and the second conductive member.

In some embodiments, the external short induction kit may further include an exterior finishing material.

In other embodiments, each of the first conductive member and the second conductive member may be formed of at least one selected from the group consisting of Cu, Al, Pt, Au, Pd, Ir, Ag, Ru, Ni, STS, Mo, V, Zn, Co, Ca, Li, Sn, Cd, Os, Rh, Cr, Ti, W, Fe, and alloys thereof but is not limited thereto.

In still other embodiments, each of the first connector and the second connector may be formed of at least one selected from the group consisting of Cu, Al, Pt, Au, Pd, Ir, Ag, Ru, Ni, STS, Mo, V, Zn, Co, Ca, Li, Sn, Cd, Os, Rh, Cr, Ti, W, Fe, and alloys thereof but is not limited thereto In even other embodiments, the insulation layer may include one of an air layer, a material layer having insulation property; and a multi layer including a material layer having insulation property and an air layer, but is not limited thereto.

In yet other embodiments, the air layer may be a layer between the conductive members prepared when grooves spaced from each other are formed in the inner side of an exterior finishing material of the external short induction kit and conductive members are inserted into and fixed at the grooves, but is not limited thereto.

In further embodiments, a material having insulation property used for the material layer and the multi layer is may be least one selected from the group consisting of polypropylene, polyethylene, polyethyleneterephthalate (PET), polyethylene-2,6-naphthalene dicarboxylate (PEN), and polycarbonate resin, but is not limited thereto.

In still further embodiments, the external short induction kit may be disposed above the broadest surface among external surfaces of an exterior finishing material of the unit battery, but is not limited thereto.

In even further embodiments, the secondary batteries may further include an insulation part between the external short induction kit and the exterior finishing material of the unit battery.

In yet further embodiments, the insulation part may be formed of at least one selected from the group consisting of polypropylene, polyethylene, polyethyleneterephthalate (PET), polyethylene-2,6-naphthalene dicarboxylate (PEN), and polycarbonate resin, but is not limited thereto.

In still other embodiments of the present invention, provided are battery modules in which electrodes of a plurality of unit batteries or connection parts connecting the plurality of unit batteries in series or parallel are connected to at least one external short induction kit for battery module.

The external short induction kit for battery module includes: a first conductive member; a first connector connecting the first conductive member and a positive electrode of one of the plurality of unit batteries; a second conductive member; a second connector connecting the second conductive member and a negative electrode of one of the plurality of unit batteries; a third conductive member; a third conductor connecting the third conductive member and connection parts connecting the plurality of unit batteries in series or parallel; and an insulation layer interposed between the conductive members.

In some embodiments, the numbers of the third conductive members and the third connectors may be identical to that of the connection parts connecting the plurality of unit batteries in series or parallel, but is not limited thereto.

In other embodiments, the external short induction kit for battery module may be disposed on an external surface of an exterior finishing material of the battery module, but is not limited thereto.

In even other embodiments of the present invention, battery packs include the battery module.

In some embodiments, the battery pack may be used as power for at least one of power tools, Electric Vehicles (EVs), Hybrid Electric Vehicles (HEVs), Plug-in Hybrid Electric Vehicles (PHEVs), E-bikes, E-scooters; electric golf carts, electric trucks, and electric commercial vehicles, but is not limited thereto.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

The present invention provides an external short induction kit of an electric device to resolve the ignition and furthermore the explosion of the electric device, which may be caused by a needle-shaped object penetrating the electric device.

The external short induction kit of the electric device according to the present invention includes at least two conductive members, at least two connectors, and an insulation layer.

The at least two conductive members cause a short after being penetrated by a needle-shaped object and are electrically connected to electrodes of the electric device.

The at least two connectors serve to electrically connect the at least two conductive members and the electric device.

In order to connect the at least two conductive members and the electric device, one end of the connector is connected to the conductive member and the other one is connected to the electrode of the electric device or a connection part (i.e., an electrical pathway between electrodes of the electric device).

The insulation layer is interposed between the at least two conductive members and serves to prevent a short in the at least two conductive member when the electric device operates normally.

When a needle-shaped object such as a nail penetrates the electric device through the above configuration, it penetrates the external short induction kit first, thereby protecting the electric device.

That is, when the needle-shaped object penetrates the external short induction kit to contact the at least two conductive members, a short occurs between the at least two conductive members. In this case, a current path is formed in the at least two conductive member and the needle-shaped object. Due to the current in the current path, the voltage and energy of the electric device are lowered primarily, thereby allowing the electric device to reach a stable state.

Accordingly, even when the needle-shaped object penetrates the external short induction kit and also the inside of the electric device, due to a short of the external short induction kit, the electric device is already in a stabilized state. Thus, phenomena such as ignition and furthermore explosion of the electric device may be prevented.

Nonrestrictive examples of the electric device may include a secondary cell, a battery module having a plurality of unit batteries, and a battery pack having a plurality of battery modules.

Hereinafter, an example that an external short induction kit is applied to one electric device of the secondary battery, the battery module, and the battery pack will be described with reference to the drawings.

The external short induction kit may be applied to one of the above listed electric devices according to only an embodiment but is not limited thereto. Additionally, the drawings are illustrated according to only an embodiment and thus the spirit of the present invention is not limited to the components in the drawings.

The secondary battery may include a unit battery having at least one positive electrode, negative electrode, and separation layer and at least one external short induction kit, which are connected to each other.

The external short induction kit may include a first conductive member; a first connector connecting the first conductive member and the positive electrode of the unit battery; a second conductive member; a second connector connecting the second conductive member and the negative electrode of the unit battery; and an insulation layer interposed between the first conductive member and the second conductive member.

The external short induction kit may adjust the numbers of the first conductive members and the second conductive members according to the number of electrodes that the unit battery includes and the forms of the unit battery and, of course, may adjust the numbers of the first and second conductors and the insulation layers according to the numbers of the first and second conductive members.

The numbers of the first conductive members and the first conductors included may be identical to that of the positive electrodes in the unit battery. The numbers of the second conductive members and the second connectors included may be identical to that of the negative electrodes in the unit battery. When the numbers of the first and second conductive members included are greater than that of the electrodes in the unit battery, the volume of the secondary battery is increased, so that the capacity per volume of the secondary battery is decreased. When the numbers of the first and second conductive members included are less than that of the electrodes in the unit battery, an internal short may occur between the electrodes in the unit battery, which are not connected to the external short induction kit. Therefore, it becomes difficult to sufficiently secure the stability of the secondary battery.

The external short induction kit may be packaged with exterior finishing materials to protect the first and second conductive members but is not limited thereto.

If materials have excellent electrical conductivity, they may be used for the first and second conductive members without specific restrictions. More preferably, metals and nonmetals having high electrical conductivity, less thermal deformation, and strong oxidation resistance may be used for the first and second conductive members.

Moreover, if the first and second conductive members are formed of the above-mentioned metals and nonmetals, the first conductive member connected to the positive electrode may not be necessarily identical to the second conductive member connected to the negative electrode. That is, the first and second conductive members may be formed of respectively different materials.

The first conductive member and the second conductive member may be formed of at least one selected from the group consisting of Cu, Al, Pt, Au, Pd, Ir, Ag, Ru, Ni, STS, Mo, V, Zn, Co, Ca, Li, Sn, Cd, Os, Rh, Cr, Ti, W, Fe, and alloys thereof, but are not limited thereto.

Additionally, although the thicknesses or sizes of the first and second conductive members are not significantly limited, since the thicknesses or sizes are a factor to induce a first short through a needle-shaped penetration in the secondary battery, their thicknesses may be properly manufactured identical or similar to that of the collector of the unit battery and their sizes may be property manufactured identical or similar to that of the unit battery, in order to protect the unit battery.

If the first and second connectors have excellent electrical conductivity like the conductive members, they are not specifically limited but, more preferably, they may be formed of metals and nonmetals having high electrical conductivity, less thermal deformation, and strong oxidation resistance.

Also, if the first connector and the second connector are formed of the above metals and nonmetals, the first connector connected to the positive electrode may not be identical to the second connector connected to the negative electrode. That is, the first connector and the second conductor may be formed of respectively different materials.

The first connector and the second connector may be formed of the same materials as the conductive members but are not limited thereto.

Moreover, the insulation layer interposed between the first and second conductive members may be diversely configured to prevent the flow of electricity between the first conductive members 100 and second conductive members 200 when the secondary battery operates normally. For example, the insulation layer may be one of an air layer, a material layer having insulation property, and a mufti layer including a material layer having insulation property and an air layer, but is not limited thereto.

The air layer means air between the first and second conductive members when they are spaced a predetermined distance from each other to prevent the flow of electricity.

The air layer may be realized through various methods. As one example, after grooves are formed being spaced from each other in the inner side of the exterior finishing material in the external short induction kit, a conductive member is inserted into and fixed at the grooves, in order to form an air layer between the conductive members.

The material layer having insulation property and the multi layer including a material layer having insulation property and an air layer, prevent the flow of electricity between the first and second conductive members by inserting a material having insulation property therebetween.

The material layer having insulation property is manufactured with the same area as each of the first conductive member and the second conductive member, and then is interposed therebetween.

In relation to the multi layer including a material layer having insulation property and an air layer, the material layer having insulation property is manufactured with a smaller area than each of the first conductive member and the second conductive member, so that the material layer and air layer having insulation property co-exist.

That is, in relation to the multi layer including a material layer having insulation property and an air layer, the material layer having insulation property may serve as a spacer between the first conductive member and the second conductive member spaced a predetermined distance from each other, in order to prevent the flow of electricity.

If a material used for the material layer and the multi layer have excellent electrical insulation and flame retardancy, it may be used without any restriction. However, more preferably, the material may include at least one selected from the group consisting of polypropylene, polyethylene, polyethyleneterephthalate (PET), polyethylene-2,6-naphthalene dicarboxylate (PEN), and polycarbonate resin, but are not limited thereto.

Especially, when the material having insulation property used for the present invention is affected by heat, shrinking polyethyleneterephthalate (PET) or polyethylene-2,6-naphthalene dicarboxylate (PEN) may be used.

The position of the external short induction kit may be disposed anywhere on the surface of the unit battery in the secondary battery. However, in order to protect the unit battery most efficiently, the external short induction kit may be disposed on an external broad surface of the exterior finishing material of the unit battery.

Furthermore, the external short induction kits having different sizes may be deposed on the external six sides of the unit battery, respectively.

Figure 1:
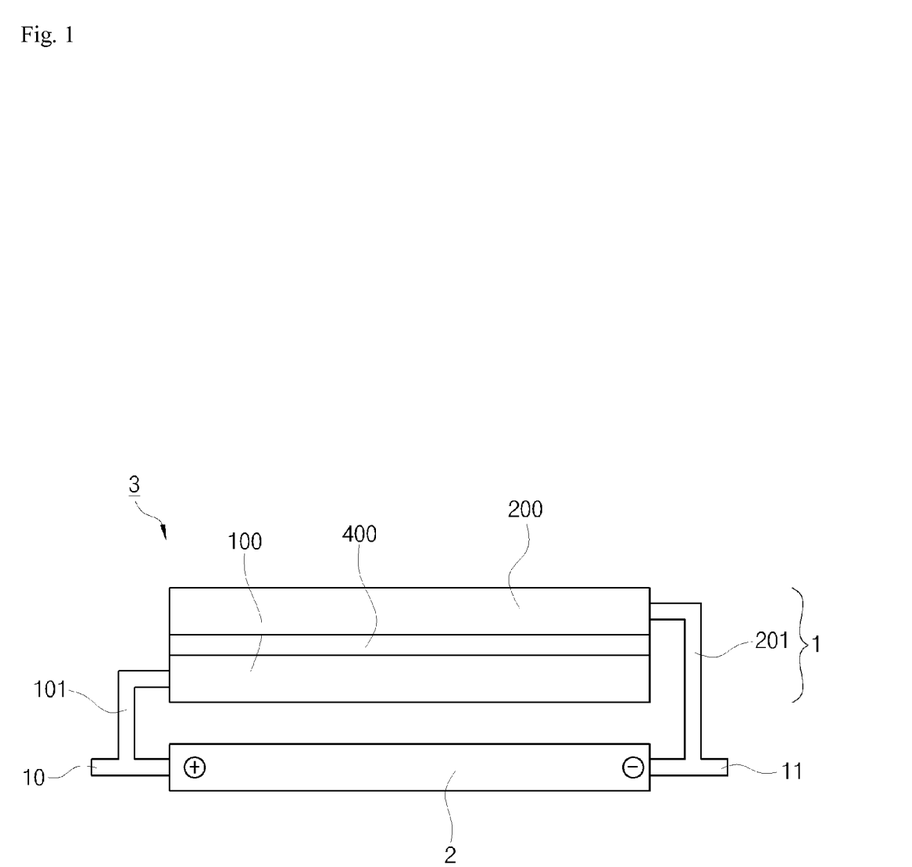
FIG. 1 is a schematic view when a unit battery is connected to one external short induction kit according to an embodiment of the present invention.

FIG. 1 illustrates a unit battery 2 to which one external short induction kit 1 is connected according to an embodiment of the present invention. Additionally, FIG. 1 illustrates a view when the external short induction kit 1 is disposed above the broad surface of the unit battery 2 to protect it from a needle-shaped object 500 of FIG. 2.

Although the external short induction kit 1 is illustrated rather thicker than the unit battery 2, it is emphasized again that the components in the drawings are rather exaggerated to describe an embodiment of the present invention.

When the external short induction kit 1 is disposed above the broad surface of the unit battery 2 as shown in FIG. 1, an insulation part (not shown) may be additionally disposed between the external short induction kit 1 and the unit battery 2.

The insulation part may be required to prevent a short between a first conductive member 100 of the external short induction kit 1 and the unit battery 2 and may be included if necessary. A material of the insulation part may have the same material having insulation property as the above-mentioned insulation layer but is not limited thereto.

Figure 2:
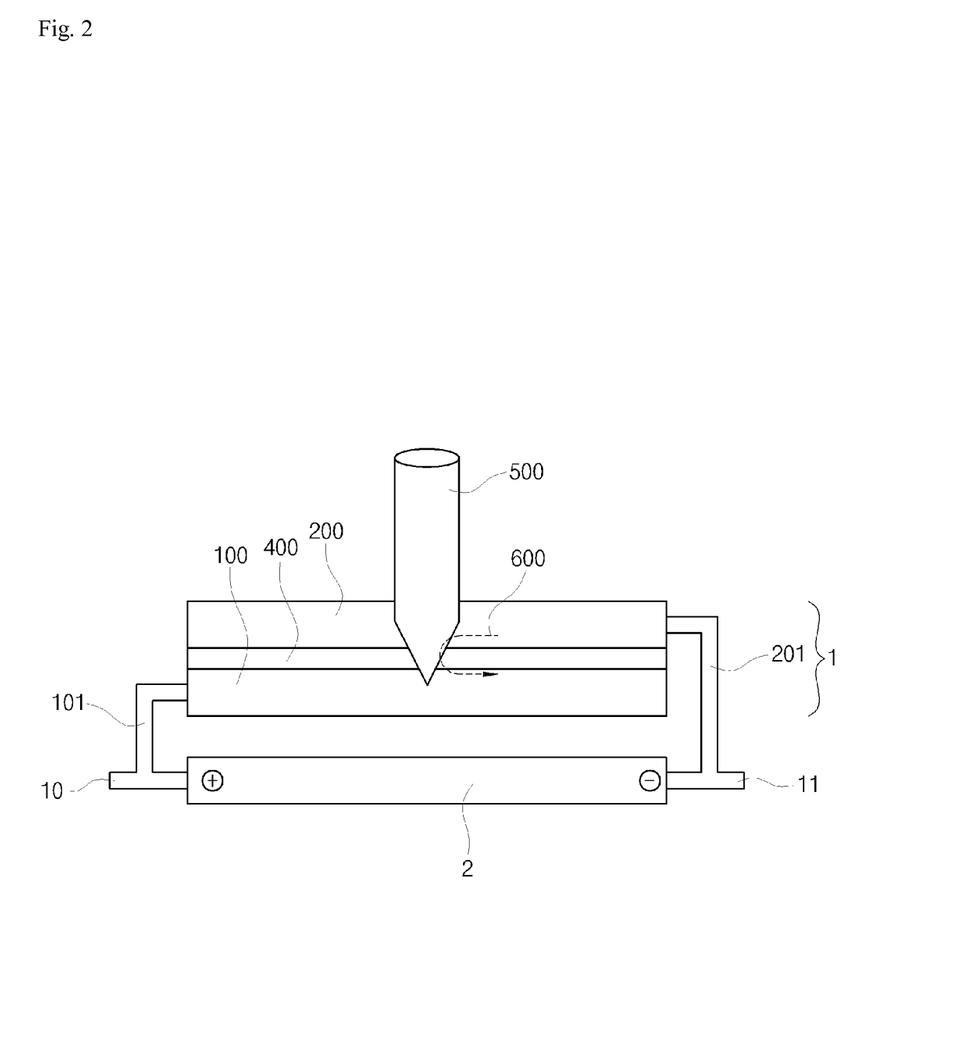
FIG. 2 is a schematic view when a needle-shaped object penetrates one external short induction kit connected to a unit battery according to an embodiment of the present invention.
Figure 3:
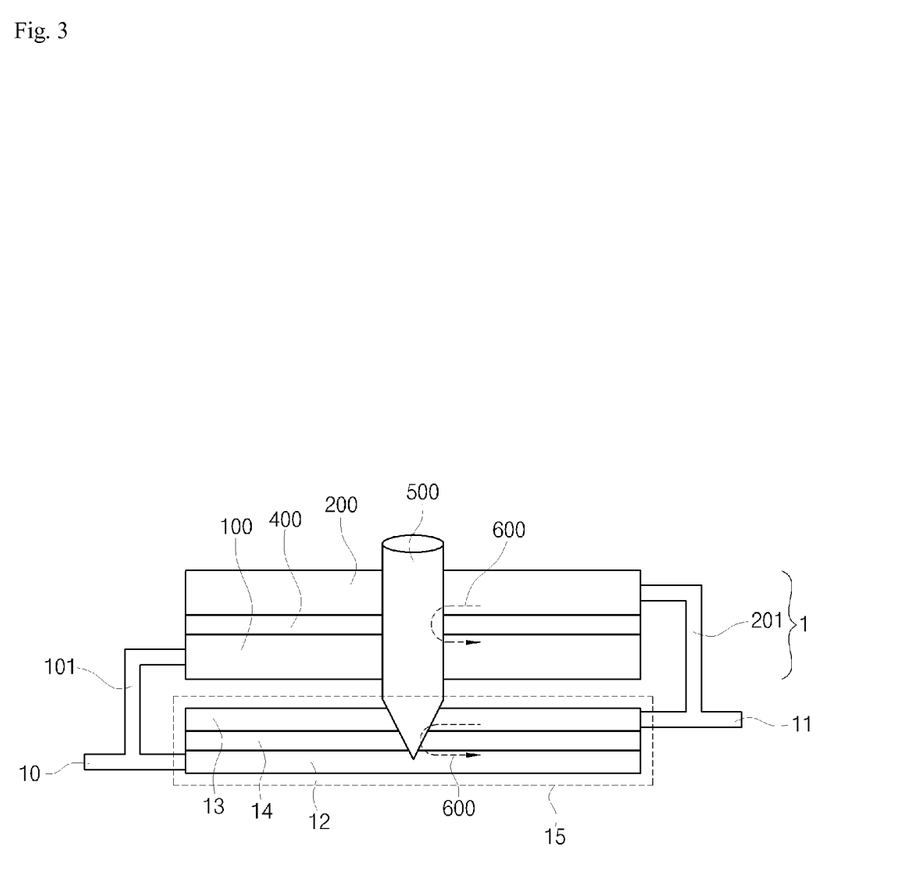
FIG. 3 is a schematic view when a needle-shaped object penetrates one external short induction kit connected to a unit battery and the unit battery according to an embodiment of the present invention.

FIG. 2 illustrates a view when only the external short induction kit 1 in a secondary battery of FIG. 1 is penetrated by the conductive needle-shaped object 500. FIG. 3 illustrates a view when both the external short induction kit 1 and the unit battery 2 in the secondary battery of FIG. 1 are penetrated by the conductive needle-shaped object 500.

Referring to FIG. 2, as the external short induction kit 1 is penetrated by the needle-shaped object 500, the first conductive members 100 and second conductive members 200 may contact each other electrically. As a result, a short occurs between the first conductive members 100 and second conductive members 200. In this case, a current path 600 is formed in the first conductive member 100, the second conductive member 200, and the needle-shaped object 500. Due to the current in the current path 600, the voltage and energy of the unit battery 2 are lowered first to allow the secondary battery 3 to reach a stable state.

Referring to FIG. 3, even when the needle-shaped object 500 penetrates both the external short induction kit 1 and the inside of the unit battery 2, due to a short in the external short induction kit 1, the unit battery 2 becomes in a stabilized state after the short occurs, thereby preventing the ignition and further more explosion of the secondary battery 3.

Figure 4:
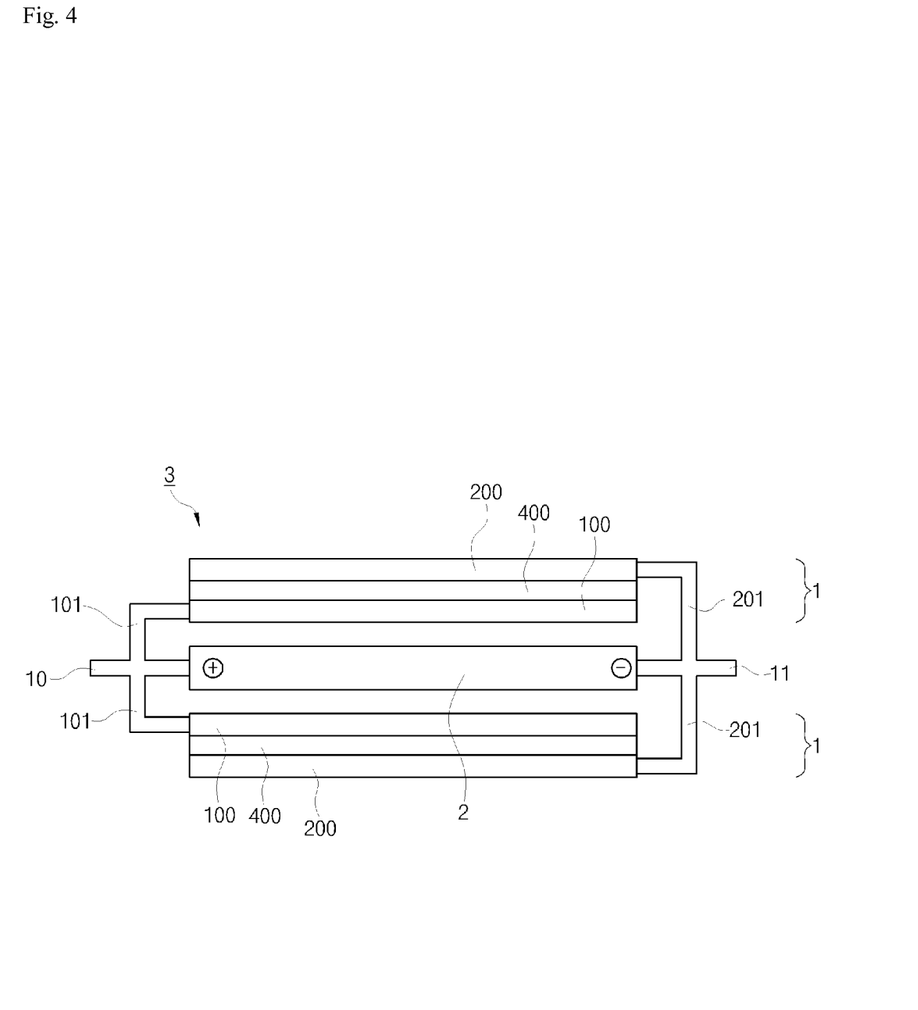
FIG. 4 is a schematic view when a unit battery is connected to two external short induction kits according to another embodiment of the present invention.

FIG. 4 illustrates a unit battery 2 to which two external short induction kits 1 are connected according to an embodiment of the present invention.

Additionally, FIG. 4 illustrates a view when the external short induction kits 1 are disposed above and below the two broad surfaces of the unit battery 2 to protect it from the needle-shaped object 500 of FIG. 2 or 3.

The structures in which the external short induction kit 1 of the present invention is connected to the unit battery 2 are described through FIGS. 1 to 4. However, the external short induction kit 1 may be connected to the unit battery 2 through various structures besides those of FIGS. 1 to 4.

Furthermore, the present invention provides a electrodes in a plurality of unit batteries or connection part connecting the plurality of unit batteries in series or parallel and a battery module to which at least one external short induction kit for battery module is connected.

The external short induction kit for battery module includes a first conductive member; a first connector connecting the first conductive member and a positive electrode of one in the plurality of unit batteries; a second conductive member; a second connector connecting the second conductive member and a negative electrode of one in the plurality of unit batteries; a third conductive member; a third connector connecting the third conductive member and connection parts connecting the plurality of unit batteries in series or parallel; and an insulation layer interposed between the conductive members.

Of course, the conductive members included in the external short induction kit for battery module according to an embodiment of the present invention may be adjusted according to the purpose and capacity of the battery module. More preferably, the fact that all connectors, which connect the electrodes of unit batteries at both ends among a plurality of unit batteries in the battery module and unit batteries aside from those at the both ends among the plurality of unit batteries, are connected to the conductive members matches the purpose of the present invention, which improves the stability of an electric device by using an external short induction kit.

Accordingly, the numbers of the third conductive members and the third connectors connected to the connection parts connecting the plurality of unit batteries in series or parallel may be identical to that of the connection parts.

Like the external short induction kit connected to the unit battery, the external short induction kit for battery module may be placed at any position on the surface of the battery module including the plurality of unit batteries. More preferably, the external short induction kit for battery module may be placed at an external broad surface of the battery module in order to protect the battery module most effectively.

Figure 5:
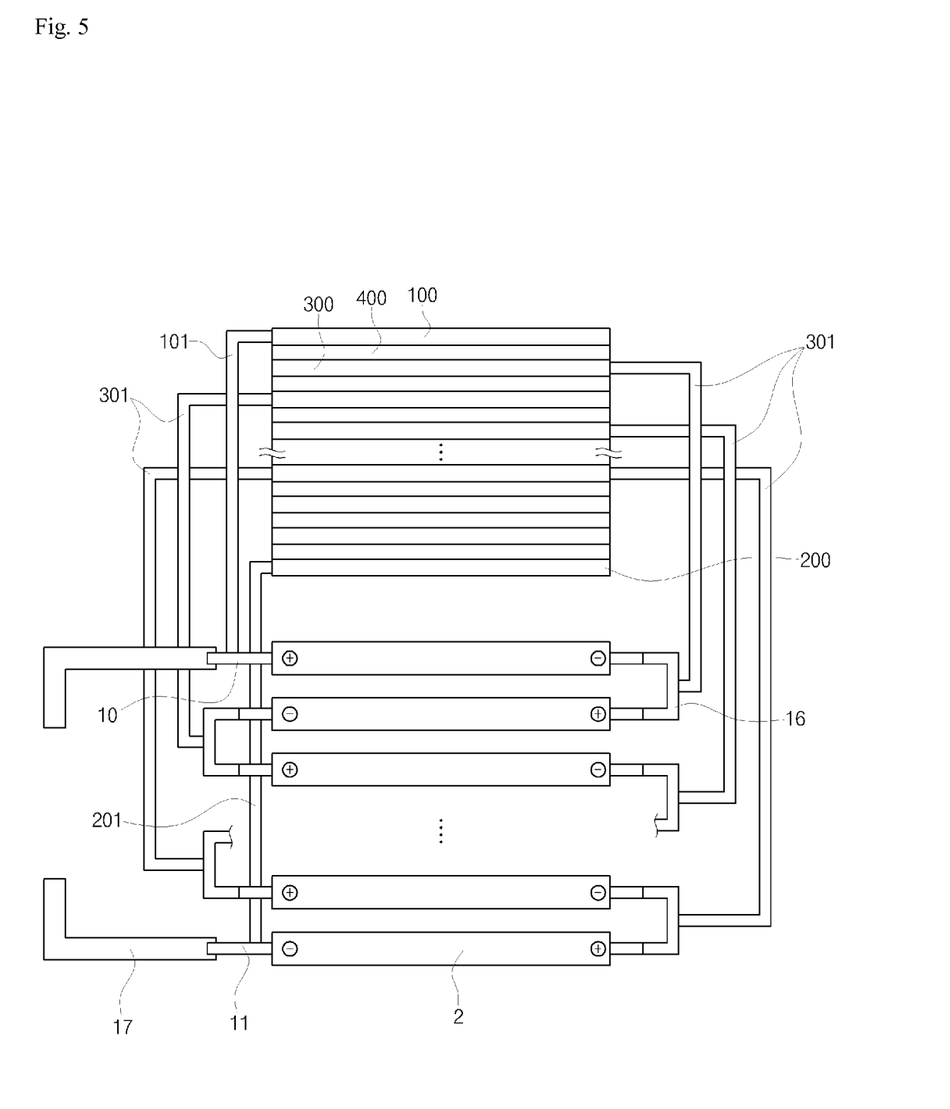
FIG. 5 is a schematic view of a battery module according to an embodiment of the present invention.

FIG. 5 illustrates a view when electrodes (i.e., positive terminals 10 and negative terminals 11) in a plurality of unit batteries or connection parts 16 are connected to an external short induction kit for battery module.

As shown in FIG. 5, in relation to the battery module, a unit battery at the outermost among a plurality of unit batteries 2 may be connected to the first conductive member 100 at the outermost opposite to the position of the unit battery in the external short induction kit for battery module.

Then, a unit battery at the next outermost is connected to a third conductive member 300 at the next outermost opposite to the unit battery in the external short induction kit for battery module. The electrodes (i.e., the positive leads 10 and the negative leads 11) in the plurality of unit batteries or the connection parts 16 are sequentially connected to the conductive members 100, 200, and 300 in a structural aspect.

In the above structure, even when the battery module is penetrated by the conductive needle-shaped object 500, a sequential external short may be induced to allow the battery module to be in a more stable state. However, the structure of the battery module according to an embodiment of the present invention is not limited thereto.

Additionally, although the first and second connectors are connected to the positive leads 10 and the negative leads 11 of the unit battery, respectively, as shown in FIG. 5, they may be connected to a bus bar 17 connected to the electrode leads and also this corresponds to the present invention. That is, the first and second connectors may be connected to any positions of the unit battery where electricity flows.

The present invention may provide a battery pack including the battery module.

The battery pack may be used as power for medium-large sized devices such as power tools, Electric Vehicles (EVs), Hybrid Electric Vehicles (HEVs), Plug-in Hybrid Electric Vehicles (PHEVs), E-bikes, E-scooters; electric golf carts, electric trucks, and electric commercial vehicles, but is not limited thereto.

Hereinafter, the present invention will be descried in more detail through an embodiment but the scope of the present invention is not limited to the embodiment below.

Example 1

Unit Battery to Which External Short Induction Kit is Connected

In order to manufacture the external short induction kit of the present invention, an aluminum thin layer as a first conductive member, PET as an insulation layer, a copper thin layer as a second conductive member are stacked and a temperature of about 80° C. and a pressure of 100,000 N/m² are applied on the stacked layers to complete a first conductive member/insulation layer/second conductive member assembly.

The first conductive member/insulation layer/second conductive member assembly is connected to a unit battery including a positive electrode, a negative electrode, and a separation layer through a first connector and a second connector, thereby manufacturing the secondary battery according to the present invention.

Comparative Example 1

Typical Unit Battery

A unit battery not connected to an external short induction kit is used.

Experimental Example

After the manufactured unit batteries of the example 1 and the comparative example 1 were fully charged under 4.2 V and the middle of each of the unit batteries was penetrated by a nail having a diameter of about 2.5 mm, it was observed whether ignition occurs or not. At this point, the nail penetration speed was about 5 m/min and its result was shown in Table 1.

TABLE 1

|  | Safety evaluation requirement | Maximum temperature | Short | Ignition |
|---|---|---|---|---|
| Example 1 | 4.2 V fully charged | 50° C. | No | No |
| Comparative Example 1 | 4.2 V fully charged | More than or Equal to 500° C. | Yes | Yes |

The middle of the unit battery connected to the external short induction kit according to the example 1 was penetrated by a nail having a diameter of about 2.5 mm at about 5 m/min speed. As a result, the external short induction kit was completely penetrated and the unit battery was partially penetrated. However, after the external short induction kit become short first to lower the voltage and energy of the unit battery, even when the unit battery was partially penetrated by the nail having a diameter of about 2.5 mm, it was observed that there was no ignition.

On the contrary, in relation to the unit battery not connected to the external short induction kit according to the comparative example 1, the unit battery was completely penetrated by the nail having a diameter of about 25 mm at about 5 m/min speed and it was observed that there was ignition.

Accordingly, the external short induction kit according to an example of the present invention may basically improve the stability of a unit battery and its result is identically applied to an electric device such as battery module and a battery pack including a plurality of unit batteries.

When a needle-shaped object penetrates an electric device, an external short induction kit of the electric device according to an example of the present invention basically prevent the ignition and furthermore explosion of the electric device to improve the stability.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An external short induction kit of an electric device, comprising:
at least two conductive members; at least two connectors having one side connected to the conductive member and the other side connected to an electrode of the electric device or a connection part, the connection part being an electrical pathway between electrodes of the electric device; and
an insulation layer interposed between the at least two conductive members,
wherein the conductive members and the electric device are spaced apart,
wherein there is a space between the external short induction kit and the electric device, and
wherein the electric device is selected from the group consisting of a secondary battery, a battery module including a plurality of unit batteries, and a battery pack including the plurality of battery modules.

2. A secondary battery in which a unit battery including a positive electrode, a negative electrode, and a separation layer is connected to at least one external short induction kit,
wherein the external short induction kit comprises:
a first conductive member;
a first connector connecting the first conductive member and a positive electrode of the unit battery;
a second conductive member;
a second connector connecting the second conductive member and a negative electrode of the unit battery; and
an insulation layer interposed between the first conductive member and the second conductive member,
wherein the conductive members and the unit battery are spaced apart, and
wherein there is a space between the external short induction kit and the unit battery.

3. The secondary battery of claim 2, wherein each of the first conductive member and the second conductive member is formed of at least one selected from the group consisting of Cu, Al, Pt, Au, Pd, Ir, Ag, Ru, Ni, STS, Mo, V, Zn, Co, Ca, Li, Sn, Cd, Os, Rh, Cr, Ti, W, Fe, and alloys thereof.

4. The secondary battery of claim 2, wherein each of the first connector and the second connector is formed of at least one selected from the group consisting of Cu, Al, Pt, Au, Pd, Ir, Ag, Ru, Ni, STS, Mo, V, Zn, Co, Ca, Li, Sn, Cd, Os, Rh, Cr, Ti, W, Fe, and alloys thereof.

5. The secondary battery of claim 2, wherein the insulation layer comprises one of an air layer, a material layer having insulation property; and a multi layer including a material layer having insulation property and an air layer.

6. The secondary battery of claim 5, wherein a material having insulation property used for the material layer and the multi layer is at least one selected from the group consisting of polypropylene, polyethylene, polyethyleneterephthalate (PET), polyethylene-2,6-naphthalene dicarboxylate (PEN) and polycarbonate resin.

7. The secondary battery of claim 2, wherein the external short induction kit is disposed above the broadest surface among external surfaces of an exterior finishing material of the unit battery.

* * * * *